Dec. 27, 1932.    L. HACKSPILL ET AL    1,892,341
MANUFACTURE OF POTASSIUM SALTS FROM POTASSIUM CHLORIDE
Filed Jan. 23, 1931
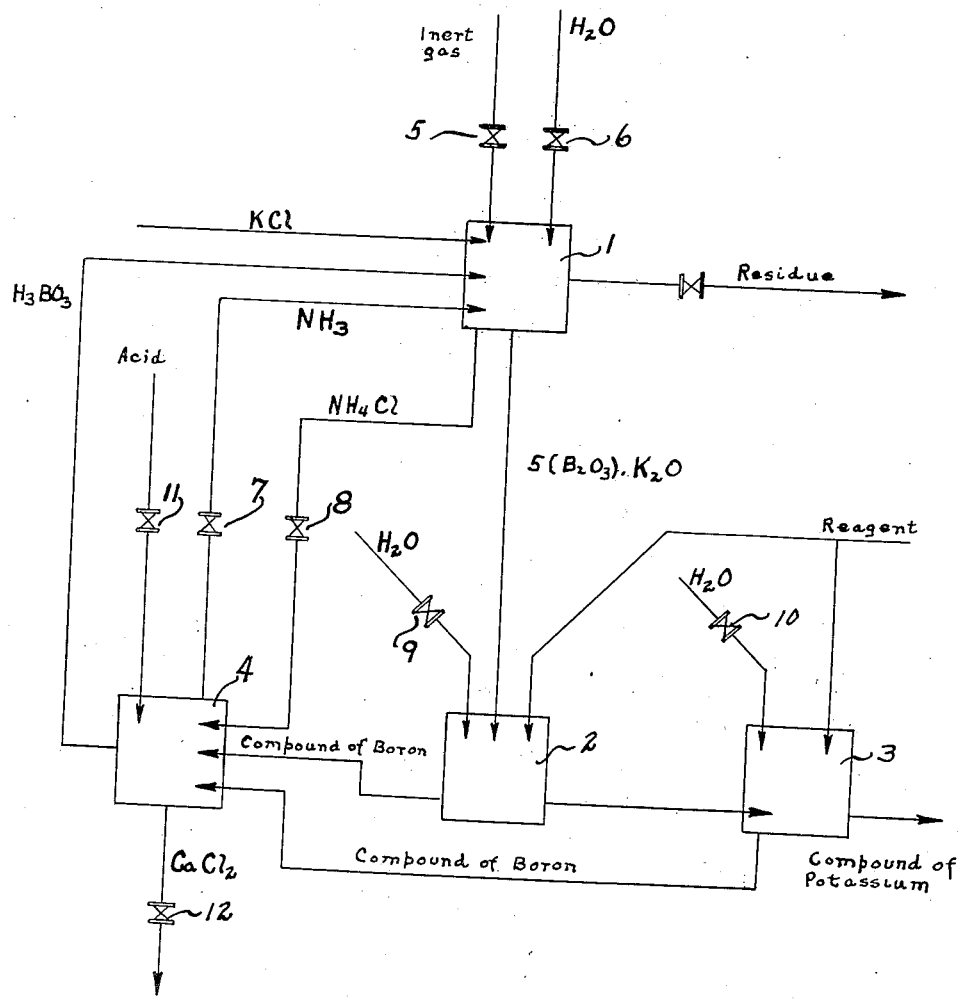
INVENTORS
Louis Hackspill
Dominique Claude
Louis E. Anders
Pierre A. A. Rollet
Emil Bönnelycke
ATTORNEY Patented Dec. 27, 1932

1,892,341

UNITED STATES PATENT OFFICE

LOUIS HACKSPILL, OF STRASBOURG, DOMINIQUE CLAUDE, OF LE RAINCY, LOUIS EMILE ANDRES, OF WISSEMBOURG, AND PIERRE ALEXANDRE ANTOINE ROLLET, OF STRASBOURG, FRANCE

MANUFACTURE OF POTASSIUM SALTS FROM POTASSIUM CHLORIDE

Application filed January 23, 1931, Serial No. 510,842, and in Germany February 5, 1930.

The present invention relates to a process for the manufacture of potassium salts from natural potassium chloride. This process essentially consists in treating the potassium chloride with boric acid in such manner as to form potassium pentaborate $5(B_2O_3).K_2O$, and this salt is then decomposed by the acid of the salt which is to be manufactured, thus producing, in addition to this latter salt, boric acid which is thus recovered.

The accompanying drawing represents a flow diagram of our process.

According to a preferred embodiment of the invention, we mix boric acid and solid potassium chloride in the proportion of $5B_2O_3$ at least to $2K$, and then heat the mixture, preferably above 100° C., in a current of steam or of inert gases (smoke from an industrial furnace, for example) so as to withdraw the hydrochloric acid which is produced.

(1)  $10H_3BO_3+2KCl=$
 $5(B_2O_3).K_2O+2HCl+14H_2O$

We may also prepare the potassium pentaborate by mixing boric acid and potassium chloride in the proportion of $5B_2O_3$ to $2K$ and producing the reaction in a concentrated solution in the presence of ammonia, preferably in the heated state.

The ammonia dissolves the boric acid, and the pentaborate will separate out, due to its small solubility by which it will precipitate. The reaction is then (2)  $10H_3BO_3+2NH_3+2KCl=$
 $5(B_2O_3).K_2O+2NH_4Cl+14H_2O.$ When the precipitated pentaborate is removed from the solution, there will remain a small amount of dissolved boric acid, which may be eliminated by any suitable means, for instance by the addition of lime.

The mother-liquor containing the ammonium chloride may be used for several operations, and the accumulation of ammonium chloride furthers the precipitation of the pentaborate.

When the solution is nearly saturated with ammonium chloride, we may remove a part of this salt by cooling below 0° C., and can use this directly or convert it by known means into ammonia which again enters the cycle of operations. The mother liquor may serve for another precipitation of potassium pentaborate, and so on.

If it is desired to obtain potassium nitrate, for instance, we act upon the potassium pentaborate with nitric acid, according to the reaction:

$5(B_2O_3).K_2O+2HNO_3+14H_2O=$
 $10H_3BO_3+2KNO_3.$

An analogous reaction may be carried out by replacing the nitric acid by sulphuric, or phosphoric acid, or more generally speaking, by a strong inorganic acid, provided that in the conditions of the reaction, the boric acid is insoluble, which is the case for all the acids above mentioned. Obviously, the precipitated boric acid is recovered, and it again enters the cycle of operations in order to form another quantity of pentaborate. The small amount of boric acid remaining in solution may be recovered by the addition of lime, which precipitates it in the form of calcium borate, from which the boric acid can be removed as will be further stated.

The same method of manufacture may be used for the industrial production of caustic potash from potassium chloride. After preparing potassium pentaborate by means of this substance, as before, we add to the latter an amount of lime so as to form a potash lye, as well as calcium borate which precipitates. This borate can then be converted into boric acid which serves to renew the potassium pentaborate.

In practically carrying out the invention, we treat, by milk of lime, the pentaborate of potassium which is dissolved or placed in suspension in water. The reaction is as follows:

(3)  $5(B_2O_3).K_2O+5Ca(OH)_2=$
 $5(B_2O_3).CaO+2KOH+4H_2O$

By a proper carbonate treatment, we can separate the lime in excess from the potash thus formed. The potash solution can be employed directly, or it may be used for the manufacture of a potash salt, such as potassium carbonate.

We have observed that the reaction producing the caustic substance (3) is an action of equilibrium, and that the equilibrium is the more favorable to the formation of potash as the liquids are more dilute, and as the excess of lime is greater.

On the other hand, we have observed that the aforesaid reaction is more rapid according as the liquid is more concentrated and the temperature higher.

From these observations, we can deduct the optimum conditions for the obtainment of the caustic product, as follows:

1. Excess of lime.
2. A sufficiently high temperature, and preferably above 60° C. We can exceed 100° to advantage, by the use of the autoclave.

On the other hand, it is preferable to carry out the reaction in a plurality of steps (usually two). In the first operation in a concentrated solution, we rapidly reach a somewhat unfavorable equilibrium (about 70%) and then, preferably after filtering, we dilute the solution, and terminate the formation of the caustic product, which at 100° is practically complete after a few hours.

The potassium pentaborate often contains a small amount of ammonia. This is recovered during the first addition of lime.

The borate of calcium is converted into boric acid by the addition of an acid which takes up the calcium, such as carbonic or hydrochloric acid (which give salts having no value) or nitric acid which gives calcium nitrate such as is much employed in agriculture.

(4) $B_2O_3.CaO + 2HCl + 2H_2O = 2H_3BO_3 + CaCl_2$ (5) $B_2O_3.CaO + CO_2 + 3H_2O = 2H_3BO_3 + CaCO_3$ (6) $B_2O_3.CaO + 2HNO_3 + 2H_2O = 2H_3BO_3 + Ca(NO_3)_2$

A modification of this method consists in treating the calcium borate by the ammoniacal salt of a strong acid, and thus the acid radical takes up the calcium and the ammonia is given off by heating. Ammonium chloride is particularly adapted for this purpose.

(7) $B_2O_3.CaO + 2NH_4Cl + 2H_2O = 2H_3BO_3 + CaCl_2 + NH_3$

This reaction is furthered by the heating, and it may be useful to employ temperatures above 100° and to operate in the autoclave. The use of an excess of ammonium chloride is favorable.

This salt can be obtained for instance from the Solvay reaction employed for the preparation of the sodium carbonate, or from the manufacture of the potassium pentaborate from boric acid, potassium chloride, and ammonia, according to the reaction cited hereinbefore.

(2) $10H_3BO_3 + 2NH_3 + 2KCl = 5(B_2O_3).K_2O + 2NH_4Cl + 14H_2O$

The boric acid and eventually the ammonia obtained by the reactions (4), (5), (6) and (7), or analogous reactions, may serve to prepare the potassium pentaborate in the wet or the dry way, for instance according to the reaction (2).

*Example I.*—Manufacture of potassium nitrate.

248 kgr. of $H_3BO_3$ are heated to the boiling point in 500 kgr. of water, then 13.6 kgr. of ammonia and 59.2 kgr. of KCl are added. A precipitate is at once formed which contains:

| | Per cent |
|---|---|
| $B_2O_3$ | 60.9 |
| $K_2O$ | 14.1 |
| $NH_3$ | 0.86 |
| Water | 24.14 |

This precipitate weighs 211 kgr. and contains 80% of $K_2O$ (or 29.75 kgr.) and 92% of $B_2O_3$. By treating these 211 kgr. of precipitate with 80 kgr. of nitric acid containing 50% of $HNO_3$, there are obtained 64 kgr. of potassium nitrate. The precipitation is repeated four times in the same mother liquor. Ammonium chloride and a small amount of potassium chloride are then precipitated by cooling below zero, and thus by alternate action the pentaborate and the chloride are precipitated.

*Example II.*—Manufacture of potassium phosphate.

372 kgr. of $H_3BO_3$ are heated to the boiling point in 500 kgr. of water, then 24.4 of $NH_3$ and 88.8 kgr. of KCl are added; the collected precipitate comprises:

| | Per cent |
|---|---|
| $B_2O_3$ | 61.3 |
| $K_2O$ | 19.9 |
| $NH_3$ | 1.05 |
| Water | 23.75 |

This precipitate contains 82% of $K_2O$ and 96.7% of $B_2O_3$.

The operation is repeated three times in the same mother-liquor, and it affords about 1000 kilograms of potassium pentaborate.

These 1000 kilograms of pentaborate are treated with phosphoric acid containing 365 kgr. of $P_2O_5$, thus forming a mixture of di-potassium phosphate and tri-potassium phosphate, both of which are quite soluble.

The boric acid is precipitated. The precipitate is filtered and phosphoric acid containing 408 kgr. of $P_2O_5$ is added to the solution, thus resulting in a monopotassium phosphate $KH_2PO_4$, which is much less soluble than $K_2HPO_4$ and $K_3PO_4$.

*Example III.*—Manufacture of potassium carbonate.

250 kilograms of potassium pentaborate having the formula $5(B_2O_3).K_2O$ are prepared as before and dissolved in 860 kilograms of water, thus resulting in a solution containing:

148 kilograms $B_2O_3$
    40 kilograms $K_2O$
    860 kilograms $H_2O$

By adding 160 kilograms of slaked lime, $Ca(OH)_2$, we obtain, after heating for 15 hours at 100° C. a precipitate of $B_2O_3$, CaO, $6H_2O$, with a yield of 68% of boric acid. This precipitate of calcium borate weighs 200 kilograms.

There remain in the solution:

47 kilograms $B_2O_3$
    40 kilograms $K_2O$

The precipitate of calcium borate is thoroughly washed, and the washing water serves to dilute the last-mentioned solution. If the washing is carried out with about 1000 kilograms of water, the solution will then have the following composition:

47 kilograms $B_2O_3$
    40 kilograms $K_2O$
    1860 kilograms $H_2O$

Add 80 kilograms of $Ca(OH)_2$. Heat for 10 hours to 100° C. and 74 kilograms of calcium borate will be precipitated. There remain in the solution 10 kilograms $B_2O_3$
    40 kilograms $K_2O$
    1860 kilograms $H_2O$ Evaporate to 58 kilograms $H_2O$.

Saturate the solution with $CO_2$. This precipitates 69 kilograms of $KHCO_3$ (containing 32 kilograms of $K_2O$), and the bicarbonate can be converted into neutral carbonate by calcination.

The solution then contains:

10 kilograms $B_2O_3$
    17 kilograms $CO_3KH$ (or 8 kilograms $K_2O$)
    50 kilograms $H_2O$ This solution is utilized in a succeeding operation.

It is obviously possible to recover a greater amount of the bicarbonate by evaporating a larger quantity of water, as the solubility of the bicarbonate of potassium is greater.

The operations which have been described are carried into effect in a system such as is shown on the accompanying flow sheet. The containers 1 and 4 are adapted to be closed and heated by steam or by another agent. The other two containers designated by reference numerals 2 and 3 are ordinary reaction vats open to the atmosphere.

Means are connected to the container or vessel 1 for conducting the potassium chloride thereto. Also, conduits are provided for conducting an inert gas and water to the container 1. These conduits are provided with control valves 5 and 6.

The vessel 1 is connected with the vessel 4 so as to receive boric acid ($H_3BO_3$) therefrom. A conduit controlled by valve 7 serves to conduct ammonia ($NH_3$) from vessel 4 to vessel 1. Another conduit controlled by valve 8 is provided to transfer water containing ammonium chloride ($NH_4Cl$) from vessel 1 to vessel 4.

Potassium pentaborate $5(B_2O_3).K_2O$ is conducted directly from vessel 1 to the reaction vat 2. Conduits are provided for simultaneously supplying a reagent to the two vats 2 and 3. In addition, water supply conduits equipped with control valves 9 and 10 are provided for introducing water into vats 2 and 3 for diluting the contents.

Vat 3 communicates directly with vat 2 in order to complete, if necessary, the reaction started in vat 2. The compound sought is withdrawn from vat 3.

The boron compound is transported from the vats 2 and 3 to the closed vessel 4. In addition, a strong acid such as hydrochloric acid (HCl) is introduced into vessel 4 by means of a conduit controlled by valve 11.

Calcium chloride ($CaCl_2$) is removed from vessel 4 by a conduit under control of valve 12.

For the preparation of the pentaborate by the dry method, boric acid and solid potassium chloride are introduced into vessel 1 with valve 6 closed and valve 5 open. The reaction takes place in the presence of inert gas at elevated temperature. Valves 7 and 8 are closed and the potassium pentaborate also prepared by the dry method is passed to the vat 2 by opening the valve 9.

For the preparation of the pentaborate by the wet method, valve 5 is closed and valve 6 opened to introduce water into the vessel 1. At the same time the valve 7 being open ammonia proceeding from a prior operation is brought from vessel 4 to the container 1.

Potassium pentaborate is formed and passed to vat 2 and the ammonium chloride is brought back to the vessel 4 by opening valve 8.

For the manufacture of a salt of potassium the reagent brought into the vat 2 should be an acid corresponding to the salt and the boric acid is brought back in the cycle by way of the vessel 4. The salt of potassium is collected at the discharge of vessel 3.

For the preparation of potassium hydroxide the reagent introduced in the vats 2 and 3 is calcium hydroxide.

The potassium hydroxide is collected at the discharge of vat 3 and the boron compound (calcium borate) is passed to the vessel 4 where it reacts with an acid introduced through open valve 11 and with ammonium chloride in a manner to regenerate boric acid which is returned to the vessel 1 with the ammonia, whereas the calcium chloride formed is removed by opening valve 12.

We claim:—

1. The process of manufacturing a potassium compound of the group consisting of the nitrate, the phosphate, the sulphate, and the hydroxide, which consists in treating natural potassium chloride with boric acid to form potassium pentaborate, and decomposing the pentaborate with a reagent chosen from the group containing nitric acid, phosphoric acid, sulphuric acid, and lime to remove the boric acid and to obtain the desired potassium salt.

2. The process of manufacturing a potassium compound of the group consisting of the nitrate, the phosphate, the sulphate, and the hydroxide, which consists in treating natural potassium chloride with boric acid to form potassium pentaborate, and dissolving the pentaborate in a strong agent chosen from the group containing nitric acid, phosphoric acid, and sulphuric acid to obtain the desired potassium salt and to precipitate the boric acid.

3. The process of manufacturing potassium hydroxide, which consists in treating natural potassium chloride with boric acid to obtain potassium pentaborate and hydrochloric acid, dissolving the pentaborate in water, mixing it with lime water to form potassium hydroxide in solution and to precipitate calcium borate, and treating the calcium borate with acid to recover the boric acid.

4. The process of manufacturing potassium hydroxide, which consists in treating natural potassium chloride with boric acid to obtain potassium pentaborate and hydrochloric acid, repeatedly dissolving the pentaborate in water and mixing it with lime water, with intermediate dilutions, to form potassium hydroxide in solution and to precipitate calcium borate, recovering the calcium borate, and treating the borate with an acid to recover the boric acid.

5. The process of manufacturing potassium hydroxide, which consists in treating natural potassium chloride with boric acid and ammonia to obtain potassium pentaborate and ammonium chloride, repeatedly dissolving the pentaborate in water and mixing it with lime water to form potassium hydroxide in solution and to precipitate calcium borate, adding the previously formed ammonium chloride to decompose the calcium borate, and heating the mixture above 100° C. to separate out the calcium chloride and to recover the boric acid and the ammonia.

In testimony whereof, they affix their signatures.

DOMINIQUE CLAUDE.
LOUIS HACKSPILL.
LOUIS EMILE ANDRES.
PIERRE ALEXANDRE ANTOINE ROLLET.